US 9,852,332 B2

(12) United States Patent
Vaghefinazari et al.

(10) Patent No.: US 9,852,332 B2
(45) Date of Patent: *Dec. 26, 2017

(54) OBJECT RECOGNITION IN LOW-LUX AND HIGH-LUX CONDITIONS

(71) Applicants: Honda Motor Co., Ltd., Tokyo (JP); Edge 3 Technologies, Inc., Phoenix, AZ (US)

(72) Inventors: Pedram Vaghefinazari, Long Beach, CA (US); Stuart Masakazu Yamamoto, Hacienda Heights, CA (US); Ritchie Winson Huang, Torrance, CA (US); Josh Tyler King, Phoenix, AZ (US); Tarek El Dokor, Phoenix, AZ (US)

(73) Assignees: HONDA MOTOR CO., LTD., Tokyo (JP); EDGE 3 TECHNOLOGIES, INC., Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/246,724

(22) Filed: Aug. 25, 2016

(65) Prior Publication Data

US 2016/0364605 A1 Dec. 15, 2016

Related U.S. Application Data

(63) Continuation of application No. 15/054,503, filed on Feb. 26, 2016, now Pat. No. 9,469,251, which is a (Continued)

(51) Int. Cl.
*G06K 9/00* (2006.01)
*B60R 1/00* (2006.01)
(Continued)

(52) U.S. Cl.
CPC ............ *G06K 9/00335* (2013.01); *B60R 1/00* (2013.01); *G06F 3/017* (2013.01);
(Continued)

(58) Field of Classification Search
CPC combination set(s) only.
See application file for complete search history.

(56) References Cited

U.S. PATENT DOCUMENTS 6,535,242 B1 3/2003 Strumolo et al.
6,545,670 B1 4/2003 Pryor
(Continued)

FOREIGN PATENT DOCUMENTS

CA 2773865 10/2012
EP 1816589 8/2007
(Continued)

OTHER PUBLICATIONS

International Search Report and Written Opinion of PCT/US2013/059408 dated Feb. 14, 2014, 7 pages.
(Continued)

*Primary Examiner* — Alex Liew
(74) *Attorney, Agent, or Firm* — Rankin, Hill & Clark LLP

(57) ABSTRACT

A system for capturing image data for gestures from a passenger or a driver in a vehicle with a dynamic illumination level comprises a low-lux sensor equipped to capture image data in an environment with an illumination level below an illumination threshold, a high-lux sensor equipped to capture image data in the environment with the illumination level above the illumination threshold, and an object recognition module for activating the sensors. The object recognition module determines the illumination level of the environment and activates the low-lux sensor if the illumination level is below the illumination threshold. If the
(Continued)

illumination level is above the threshold, the object recognition module activates the high-lux sensor.

20 Claims, 3 Drawing Sheets

Related U.S. Application Data continuation of application No. 14/300,569, filed on Jun. 10, 2014, now Pat. No. 9,302,621, which is a continuation of application No. 13/659,826, filed on Oct. 24, 2012, now Pat. No. 8,781,171.

(51) Int. Cl.
| | |
|---|---|
| G06F 3/01 | (2006.01) |
| H04N 5/235 | (2006.01) |
| G06K 9/20 | (2006.01) |
| H04N 5/33 | (2006.01) |
| H04N 5/232 | (2006.01) |

(52) U.S. Cl.
CPC ..... *G06K 9/00355* (2013.01); *G06K 9/00832* (2013.01); *G06K 9/00845* (2013.01); *G06K 9/209* (2013.01); *H04N 5/232* (2013.01); *H04N 5/2351* (2013.01); *H04N 5/33* (2013.01); *B60R 2300/105* (2013.01); *B60R 2300/106* (2013.01); *B60R 2300/8006* (2013.01)

(56) References Cited

U.S. PATENT DOCUMENTS

| | | | |
|---|---|---|---|
| 7,177,486 | B2 | 2/2007 | Stewart et al. |
| 7,406,181 | B2 | 7/2008 | O'Boyle et al. |
| 7,466,847 | B2 | 12/2008 | Komura |
| 7,570,805 | B2 | 8/2009 | Gu |
| 7,602,947 | B1 | 10/2009 | Lemelson et al. |
| 8,781,171 | B2 | 7/2014 | King et al. |
| 9,302,621 | B2 | 4/2016 | Vaghefinazari et al. |
| 2001/0003168 | A1 | 6/2001 | Breed et al. |
| 2001/0029416 | A1 | 10/2001 | Breed et al. |
| 2002/0005778 | A1 | 1/2002 | Breed et al. |
| 2002/0029103 | A1 | 3/2002 | Breed et al. |
| 2002/0031242 | A1 | 3/2002 | Yasui et al. |
| 2002/0126876 | A1 | 9/2002 | Paul et al. |
| 2003/0223617 | A1 | 12/2003 | Wallace et al. |
| 2004/0239761 | A1 | 12/2004 | Jin et al. |
| 2005/0111700 | A1 | 5/2005 | O'Boyle et al. |
| 2005/0226472 | A1 | 10/2005 | Komura |
| 2005/0271280 | A1 | 12/2005 | Farmer et al. |
| 2007/0075919 | A1 | 4/2007 | Breed |
| 2007/0263901 | A1 | 11/2007 | Wu et al. |
| 2008/0292144 | A1 | 11/2008 | Kim |
| 2009/0010494 | A1 | 1/2009 | Bechtel et al. |
| 2010/0039500 | A1 | 2/2010 | Bell et al. |
| 2011/0249120 | A1 | 10/2011 | Bingle et al. |
| 2013/0229508 | A1 | 9/2013 | Li et al. |

FOREIGN PATENT DOCUMENTS

| | | |
|---|---|---|
| JP | 1987091802 | 4/1987 |
| JP | 2007336449 | 12/2007 |
| JP | 2008042806 | 2/2008 |
| JP | 2010253987 | 11/2010 |
| JP | 2010268343 | 11/2010 |
| JP | 2011142500 | 7/2011 |
| WO | 2010083259 | 7/2010 |

OTHER PUBLICATIONS

Notification of Reasons for Refusal of JP Application No. 2015-539601 dated Sep. 29, 2015, 5 pages.
Office Action of JP Application No. 2015-539601 dated Apr. 5, 2016, 5 pages.

OBJECT RECOGNITION IN LOW-LUX AND HIGH-LUX CONDITIONS

CROSS REFERENCE TO RELATED APPLICATIONS

This application is a continuation of U.S. application Ser. No. 15/054,503 filed on Feb. 26, 2016, which is a continuation of U.S. application Ser. No. 14/300,569 filed on Jun. 10, 2014 and now issued as U.S. Pat. No. 9,302,621, which is a continuation of U.S. application Ser. No. 13/659,826, filed Oct. 24, 2012 and now issued as U.S. Pat. No. 8,781,171, all of which are expressly incorporated herein by reference.

BACKGROUND

Field of Disclosure

The disclosure generally relates to object recognition, in particular to object recognition in low-lux and high-lux conditions in a vehicle.

Description of the Related Art

Image sensors are used to capture image data for objects in various different environments. Moreover, the image sensors or additional equipment are adjusted to best suit the environment being monitored. For example, in an environment with low illumination, i.e. low-lux level, an image sensor may be supplemented by an illumination source that provides constant illumination. While such adjustments work well for static environments, these adjustments do not address the challenges presented by a dynamic environment. For example, an image sensor monitoring objects within a vehicle and adjusted for a particular illumination level may not be effective when the illumination level within the vehicle drops because the vehicle is passing through a dark spot or is being driven during the night.

BRIEF DESCRIPTION

Embodiments of the invention capture image data for gestures from a passenger or a driver in a vehicle with a dynamic illumination level. The disclosed system comprises a low-lux sensor equipped to capture image data in an environment with an illumination level below an illumination threshold, a high-lux sensor equipped to capture image data in the environment with the illumination level above the illumination threshold, and an object recognition module for activating and deactivating the sensors. The low-lux and high-lux sensors are located in an overhead console of the vehicle.

The object recognition module determines the illumination level of the environment and determines whether the illumination level is below the illumination level threshold. If the illumination level is below the threshold, the object recognition module activates the low-lux sensor. In one embodiment, the object recognition module also activates an illumination source with activation of the low-lux sensor. The illumination source illuminates the environment for the low-lux sensor and enables the low-lux sensor to capture image data at the low illumination level. If the illumination level is above the threshold, the object recognition module activates the high-lux sensor. In one embodiment, the high-lux sensor includes an infrared filter to reduce the amount of infrared light reaching the high-lux sensor.

Other embodiments of the invention include a computer-readable medium that store instructions for implementing the above described functions of the system, and a computer-implemented method that includes steps for performing the above described functions.

DETAILED DESCRIPTION

The computing environment described herein captures image data representing gestures from a driver or a passenger in low-lux and high-lux conditions in a vehicle. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
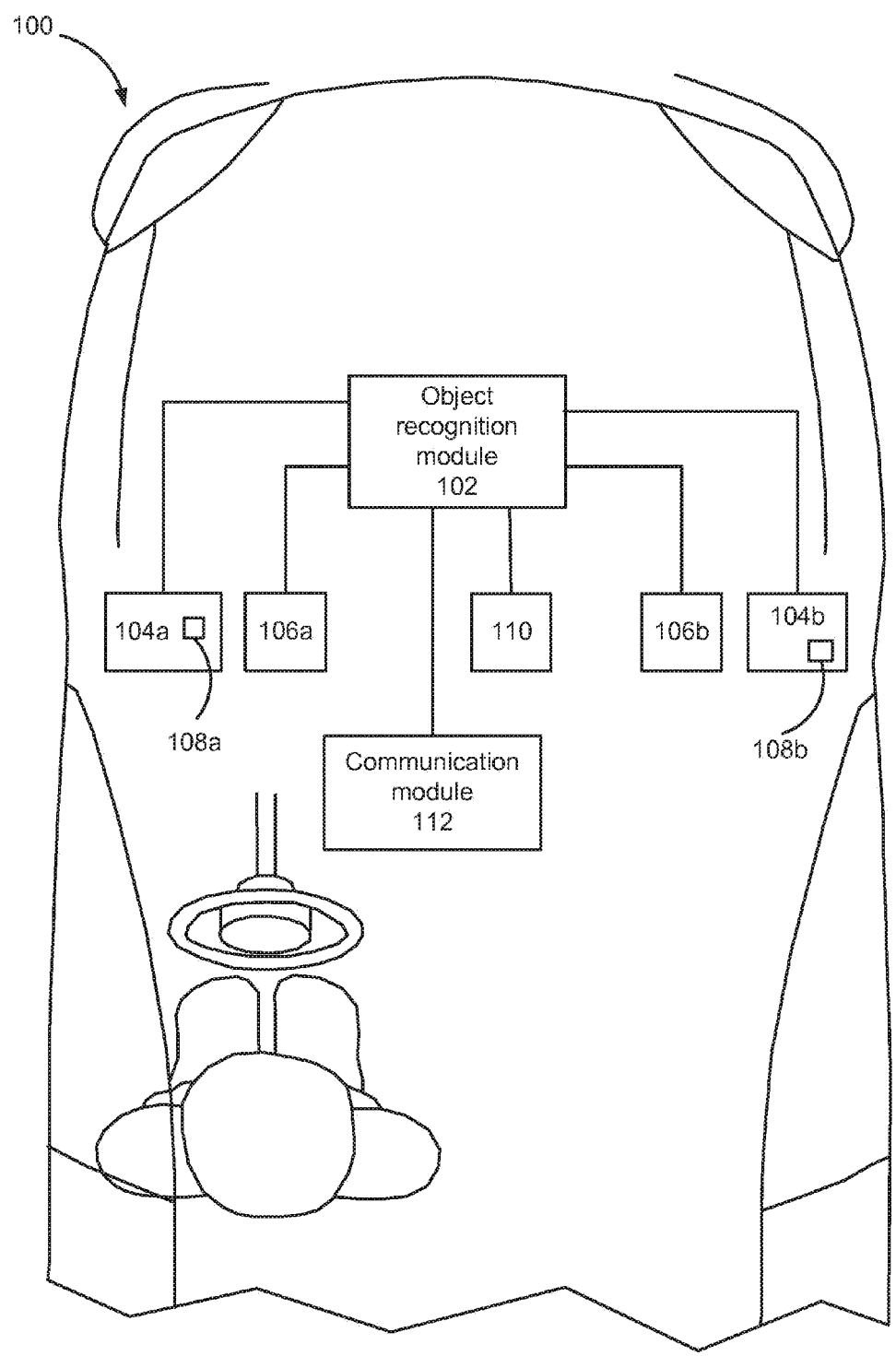
FIG. 1 is a block diagram illustrating a computing environment for capturing image data in an environment with dynamic illumination level according to one embodiment.

Referring to FIG. 1, the computing environment 100 for capturing image data in an environment with dynamic illumination level comprises an object recognition module 102, a pair of low-lux image sensors 104a-b (e.g., infrared sensors), a pair of high-lux image sensors 106a-b (e.g., RGB sensors), an illumination level detector 110, and a communication module 112. Although the illustrated computing environment 100 includes two low-lux image sensors 104a-b and two high-lux image sensors 106a-b, other embodiments of the computing environment 100 may include one or more of the low-lux image sensors 104a-b and high-lux image sensors 106a-b. Additionally, in one embodiment, the computing environment 100 is present within a vehicle or a mobile cabin. The computing environment 100 may also be located in other environments that have a dynamic illumination level.

The illumination level detector 110 is a device that measures the amount of light present in the environment 100. In one embodiment, the illumination level detector 110 includes photovoltaic sensors that convert light into electricity that can be measured. The illumination level detector 110 measures the amount of electricity produced and determines the amount of light or the illumination level for the environment based on the measured electricity. In one embodiment, the illumination level detector employs the principles of light meters like the reflected-light meters or the incident-light meters to measure the illumination level in the environment 100.

The object recognition module 102 receives the measured illumination level from the illumination level detector 110, determines whether the illumination level is beyond a lux threshold, and activates the high-lux image sensors 106a-b or the low-lux image sensors 104a-b based on the determination. In one embodiment, the object recognition module 102 activates the low-lux image sensors 104a-b in response to determining that the illumination level is below the lux threshold, and activates the high-lux image sensors 106a-b in response to determining that the illumination level is equal to or above the lux threshold. In another embodiment, the object recognition module 102 ensures that both low-lux and high-lux sensors 104a-b, 106a-b are not active at the same time. Accordingly, in response to activating low-lux sensors 104a-b, the object recognition module 102 deactivates any active high-lux sensors 106a-b and vice versa. The object recognition module 102 then receives image data from the activated sensors 104, 106, processes the received image data, and recognizes an object in the image based on the processing. In one embodiment, the recognized object is a person performing a particular gesture, and the object recognition module 102 performs a function like communicating with a user through the communication module 112 based on the recognized object.

The selective activation by object recognition module 102 of the low-lux sensors 104a-b and the high-lux sensors 106a-b beneficially enables the object recognition module 102 to capture data both in low-lux conditions (i.e. conditions when the environment 100 includes low amount of light) and in high-lux conditions (i.e. conditions when the environment 100 includes adequate or high amount of light). Accordingly, the object recognition module 102 can be beneficially used in environments with dynamic illumination levels to capture and process image data.

The communication module 112 provides an interface between a user and the object recognition module 102. The communication module 112 therefore comprises an output device and optionally an input device for communication with the user. Examples of output devices include a touch screen for visual communication and an audio device for audio communication. Examples of input devices include a touch screen, a mouse, and a keypad.

The high-lux sensors 106a-b are image sensors capable of capturing image data at an illumination level above or equal to the lux threshold. Examples of such high-lux sensors 106a-b include charge-coupled device (CCD) sensors or complementary metal-oxide-semiconductor (CMOS) sensors that have the appropriate sensitivity to light, i.e. luminance range, to capture image data in presence of illumination level above or equal to the lux threshold. Luminance range of an image sensor 106a is the range of the scene luminance under which the sensors 106a-b is equipped to capture image data. For example, luminance range of the high-lux sensors 106a-b can be 300-1000 candela per square meter or 1000-12000 Lux.

In one embodiment, the high-lux sensors 106a-b are color image sensors that capture image data to reproduce a colored image of environment 100. These color high-lux sensors 106a-b may optionally be used with an infrared blocking filter to reduce or minimize any distortions caused by light with infrared wavelengths. In one embodiment, the two high-lux sensors 106a-b are located at an interocular distance (i.e. the approximate distance between a person's eyes) from each other to capture three-dimensional images for stereo image processing.

The low-lux sensors 104a-b are image sensors capable of capturing image data at an illumination level below the lux threshold. Examples of such low-lux sensors 104a-b include CCD or CMOS sensors that have the appropriate luminance range to capture image data in presence of illumination level below the lux threshold. In one embodiment, the low-lux image sensors have a luminance range of 25-350 candelas per square meter or 0-80 Lux. In one embodiment, the two low-lux sensors 104a-b are located at an interocular distance from each other to capture three-dimensional images for stereo image processing. In one embodiment, the luminance range of low-lux sensors 104a-b is different from the luminance range of high-lux sensors 106a-b. The different luminance ranges enable the low-lux sensors to better capture image data at lower illumination levels and enable the high-lux sensors to better capture image data at higher illumination levels. In another embodiment, the luminance range for the low-lux image sensors 104a-b and high-lux image sensors 106a-b is the same.

In one embodiment, the low-lux image sensors 104a-b have associated illumination sources 108a-b that illuminate the field of view of the low-lux image sensors 104a-b. Examples of image sensors with associated illumination sources include DEFENDER SPARTAN5 night vision camera and CCTV EX11DXL dual sensor color night vision camera. Moreover, in one embodiment as described below, the illumination sources 108a-b emit a light with a spectrum that includes a single wavelength or similar wavelengths. In this embodiment, the low-lux sensors 104a-b are monochrome image sensors that are efficient in converting received light with wavelengths similar to the wavelengths of the light emitted by the illumination sources 108a-b. These monochrome low-lux sensors 104a-b are beneficially adept at capturing image data at low illumination levels.

In one embodiment, the illumination sources 108a-b emit infrared light to illuminate the scene, and the low-lux sensors 104a-b in this embodiment do not include an infrared filter to reduce or minimize the infrared light reaching the low-lux sensors 104a-b. Because the illumination sources 108a-b are illuminating the scene with an infrared light, the lack of infrared filter beneficially enables the low-lux sensors 104a-b to capture image data when the environment 100 is illuminated with the infrared light.

The illumination sources 108a-b, in one embodiment, are included in or attached to the low-lux image sensors 104a-b. In other embodiments of the environment 100, illumination sources 108a-b are physically separate from the low-lux image sensors 104a-b.

The illumination sources 108a-b, in one embodiment, are near infrared (NIR) light emitting diodes (LEDs) that emit near infrared light to illuminate the field of view of the sensors 104a-b. Because the NIR light is invisible to humans, the NIR light beneficially illuminates the field of view without distracting the humans in the environment 100. In the case where the environment 100 being illuminated is within a vehicle, illuminating the environment 100 without distracting the driver is desirable. In another embodiment, the illumination sources 108a-b emit light other than NIR light to illuminate the field of view. Additionally, in one embodiment, the illumination sources 108a-b emit light with a spectrum including a single wavelength or similar wavelengths because illuminating the field of view with such light beneficially reduces the chromaticity of the image resulting from data captured by the low-lux image sensors 104a-b.

In another embodiment, the illumination sources 108a-b emit light with a band of spectrum that lies within a range at the peak of the response curve of the low-lux image sensors 104a-b. The response curve of an image sensor indicates the sensor's efficiency in generating current per amount of light received by the sensor at different wavelengths. Accordingly, the illumination sources 108a-b emit light with a spectrum band that includes wavelengths at which the low-lux image sensors 104a-b produce a high amount of current per amount of light received by the sensors 104a-b. For example, the illumination sources 108a-b emit light with wavelengths between 750 nanometers (nm) and 900 nm because the low-lux sensors 104a-b produce 0.2-0.275 amps per watts (A/W) for light received in these wavelengths and generally produce lesser current for light at other wavelengths.

The illumination sources 108a-b, the low-lux sensors 104a-b and the high-lux sensors 106a-b are optionally physically located above a region being monitored in the environment 100. The higher location of the sensors 104a-b, 106a-b beneficially provides the sensors 104a-b, 106a-b a substantially unobstructed view of the monitored region. For example, when the environment 100 is located within a vehicle and the region being monitored is the region around the driver or a passenger, the sensors 104a-b, 106a-b and illumination sources 108a-b are located in an overhead console above the center console between the driver seat and passenger seat. In addition to a substantially unobstructed view, the location of the sensors 104a-b, 106a-b in the vehicle reduces any undesirable effects of direct incident light entering the vehicle from the front windshield.

Additionally, in one embodiment, the illumination sources 108a-b are located adjacent to the sensors 104a-b, and the illumination sources 108a-b illuminate the region in front of the sensors 104a-b. Because the illumination sources 108a-b are located adjacent, and not opposite, to the sensors, direct incident light from illumination sources 108a-b on sensors 104a-b is beneficially minimized.

Object Recognition Module

Figure 2:
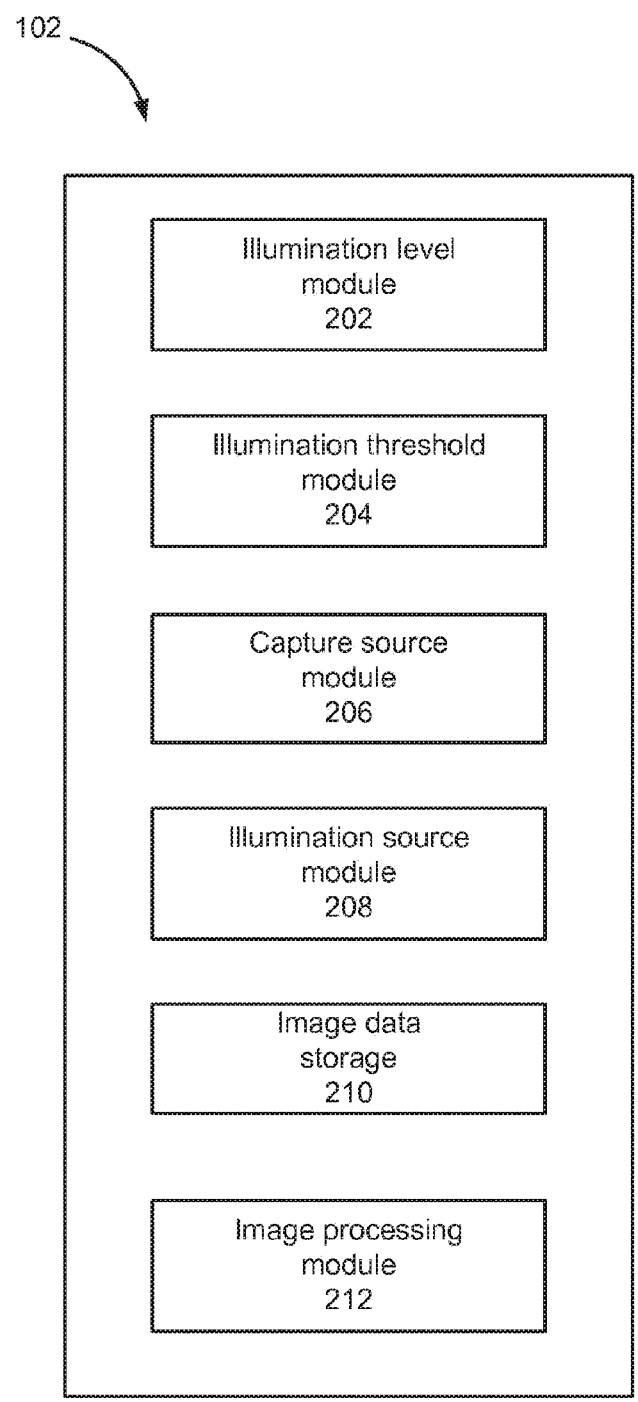
FIG. 2 is a block diagram illustrating an object recognition module in the computing environment for capturing image data in an environment with dynamic illumination level according to one embodiment.

FIG. 2 is a block diagram illustrating an object recognition module 102 in the computing environment for capturing image data in an environment with a dynamic illumination level according to one embodiment. The object recognition module 102 comprises an illumination level module 202, an illumination threshold module 204, a capture source module 206, an illumination source module 208, an image data storage 210 and an image processing module 212.

The illumination level module 202 is communicatively coupled to the illumination level detector 110 and the illumination level module 202 determines the illumination level measured by the detector 110. In one embodiment, the illumination level module 202 repeatedly polls the illumination level detector 110 to determine the measured illumination level. In another embodiment, the illumination level detector 110 is configured to repeatedly transmit the measured illumination level and the illumination level module 202 receives the transmitted illumination level. In yet another embodiment, the illumination level module 202 receives a threshold number of illumination level measurements or receives illumination level measurements for a threshold amount of time, and the illumination level module 202 determines the illumination level based on the received readings. For example, the illumination level may determine the average of the received readings as the illumination level. Such determination based on multiple illumination level measurements beneficially enable the object recognition module 102 to account for any outlier readings that may be caused because of a temporary malfunction of the detector 110 or a temporary obstacle in front of the detector 110.

The illumination threshold module 204 receives the determined illumination level from the illumination level module 202 and determines whether the determined illumination level is beyond a lux threshold. In one embodiment, the lux threshold is configurable and a user or a module may provide the appropriate lux threshold through a user interface to the illumination threshold module 204. In one embodiment, the lux threshold is based on the luminance range of the low-lux image sensors 104a-b or the high-lux image sensors. For example, the lux threshold is set to a value within the overlap of the luminance ranges of the low-lux sensors 104a-b and high-lux sensors 106. Accordingly, if the luminance range for low-lux sensors 104a-b is 25-350 candelas per square meter and the luminance range for high-lux sensors 106a-b is 300-1000 candela per square meter, the lux threshold may be set to 325 candelas per square meter. Such a lux threshold beneficially ensures that the current illumination level is within the luminance range of the sensors 104, 106 when either of the sensors 104, 106 are activated.

The capture source module 206 activates the low-lux sensors 104a-b or the high-lux sensors 106a-b based on the determination made by the illumination threshold module 204. If the illumination threshold module 204 determines that the illumination level is beyond or equal to the lux threshold, the capture source module 206 activates the high-lux sensors 106a-b. Otherwise, the capture source module 206 activates the low-lux sensors 104a-b. In one embodiment, the capture source module 206 deactivates the low-lux sensors 104a-b when the capture source module 206 activates the high-lux sensors 106a-b and vice versa. Such deactivation beneficially ensures that the image data is being captured by the appropriate sensors suited for the current lux condition of the environment 100.

The illumination source module 208 controls the activation and deactivation of the illumination sources 108a-b. In one embodiment, the illumination source module 208 is in communication with the capture source module 206 and the illumination source module 208 activates and deactivates the illumination sources 108a-b responsive to the capture source module 206 activating and deactivating the low-lux sensors 104a-b. In another embodiment, the illumination source module 208 activates and deactivates the illumination sources 108a-b based on the determination made by the illumination threshold module 204. If the illumination threshold module 204 determines that the illumination level is equal to or beyond the lux threshold, the illumination source module 208 deactivates any active illumination sources 108a-b. Otherwise, the illumination source module 208 activates the illumination sources 108a-b. The activated illumination sources 108a-b beneficially illuminate the field of view of the low-lux sensors 104a-b.

The image data storage 210 is a volatile or non-volatile storage that receives and stores the image data captured by the image sensors 104a-b, 106a-b. In one embodiment, the image data storage 210 stores separately the image data from the low-lux sensors 104a-b and the high-lux sensors 106a-b. The separately stored image data enables the image processing module 212 to process the image data from the two different types of sensors 104a-b, 106a-b in different manners as needed.

The image processing module 212 processes the image stored in image data storage 210, recognizes an object based on the processing, and initiates a response based on the recognized object. The image processing module 212 may implement a technique like stereoscopic image processing technique to process the data and recognize an object. An example of such a technique is described in scholarly paper titled "Stereoscopic Image Processing" (available at http://dsp-book.narod.ru/DSPMW/57.PDF), which is incorporated by reference herein in its entirety. Based on the recognized object, the image processing module 212 determines and initiates an appropriate response. For example, the image processing module 212 may process the stored image data and determine that the stored image data indicates a human is performing a particular gesture. In response to this determination, the image processing module 212 queries a database (not shown) and determines a user request associated with the gesture. The image processing module 212 then directs the appropriate processes to take appropriate action in response to the determined request. For example, if the request indicates that the user wants to instruct an audio player to play a particular music file, the image processing module 212 communicates with the music player and instructs the player to play the music file. Additional examples of requests associated with various gestures include requesting activation or deactivation of a light within a car, requesting an application in the vehicle, like Global Positioning System, to be activated or deactivate, and requesting a driving feature like cruise control to be activated or deactivated.

Object Recognition Methodology

Figure 3:
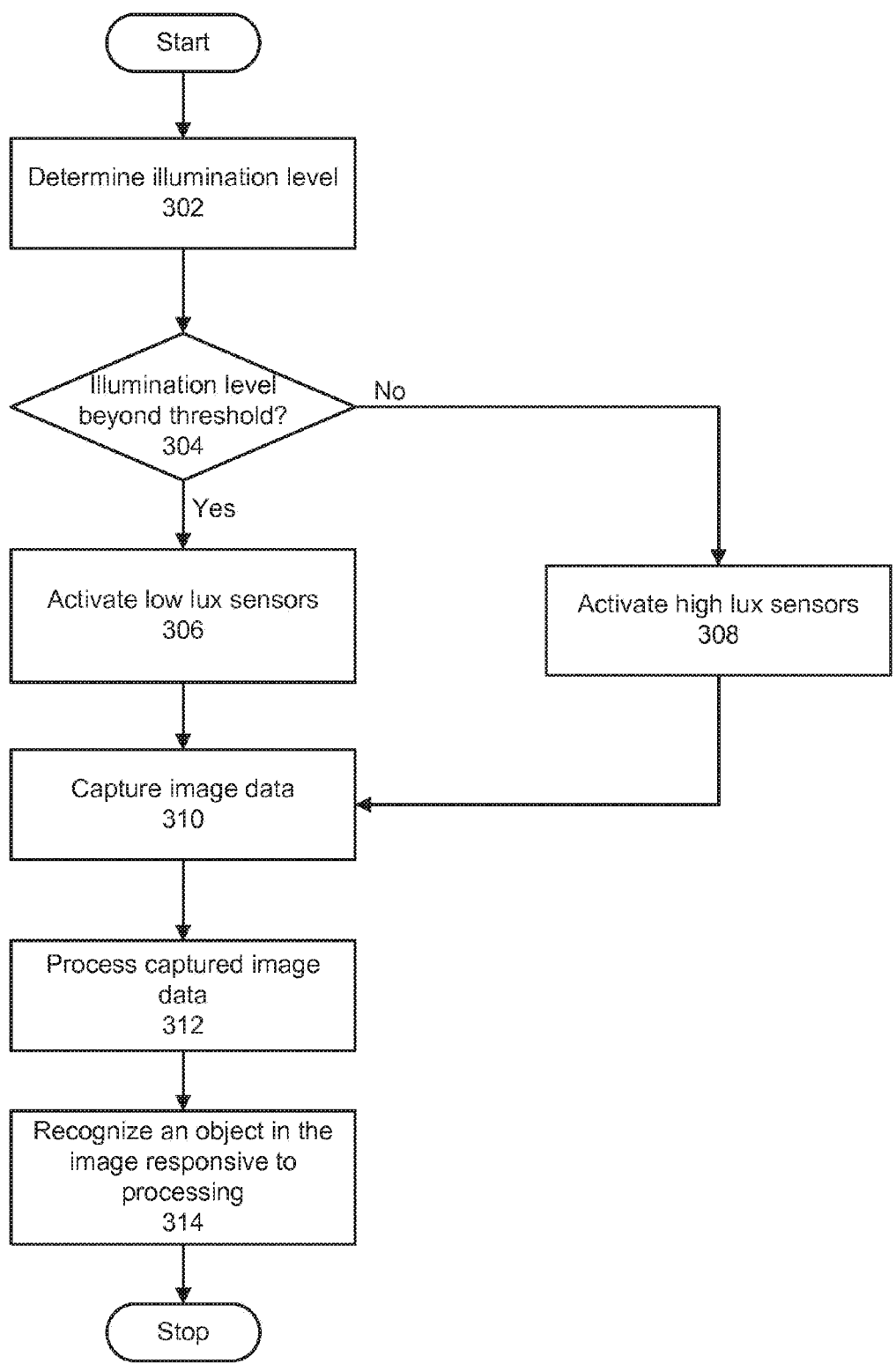
FIG. 3 is a flow diagram illustrating a method for capturing image data in an environment with dynamic illumination level according to one embodiment.

FIG. 3 is a flow diagram illustrating a method for capturing image data in an environment with dynamic illumination level according to one embodiment. The object recognition module 102 determines 302 the illumination level in the environment 100 and determines 304 whether the illumination level is below a lux threshold. If the illumination is below the lux threshold, the object recognition module 102 activates 306 the low-lux sensors 104*a-b* and optionally the illumination sources 108*a-b*. In one embodiment, the object recognition module 102 also deactivates 306 any active high-lux sensors 106*a-b* with activation of the low-lux sensors 104*a-b*.

If the determined illumination level is not below the lux threshold, the object recognition module 102 activates 308 the high-lux sensors 106*a-b*. Additionally, in one embodiment, the object recognition module 102 deactivates any active low-lux sensors 104*a-b* and illumination sources 108*a-b* with activation of the high-lux sensors 106*a-b*. The object recognition module 102 then captures 310 and processes 312 image data. In one embodiment, as the illumination level repeatedly varies to levels above and below the lux threshold, the object recognition module 102 repeatedly activates the high-lux sensors 106*a-b* and the low-lux sensors 104*a-b*. The object recognition module 102 captures data from the sensors 104*a-b*, 106*a-b* and processes the captured data. In another embodiment, the high-lux sensors 106*a-b* and the low-lux sensors 104*a-b* are constantly active, and the object recognition module 102 captures data from either of the sensors based on the illumination level. If the illumination level is below the lux threshold, the object recognition module 102 captures and processes data from the low-lux sensors 104*a-b*. Otherwise, the object recognition module 102 captures and processes data from the high-lux sensors 106*a-b*. Accordingly, the recognition module 102 is capable of capturing and processing data in conditions with varying lux levels like a vehicle driving through a tunnel wherein the lux level increases and decreases as the vehicle enters and exits the tunnel. Based on the processing, the object recognition module 102 recognizes 314 an object in the image and initiates an appropriate response.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. One of ordinary skill in the art will understand that the hardware, implementing the described modules, includes at least one processor and a memory, the memory comprising instructions to execute the described functionality of the modules.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for capturing image data, the method comprising:
   determining an illumination level using a low-lux sensor and a high-lux sensor, the low-lux sensor assigned to capture image data when illumination levels are below a threshold illumination level, the high-lux sensor assigned to capture image data when illumination levels are above a threshold illumination level, the image data indicative of one or more gestures;

determining, by an illumination threshold module, whether the determined illumination level is below a threshold illumination level;

processing image data captured by the low-lux sensor when the illumination level is below the threshold illumination level; and processing image data captured by the high-lux sensor when the illumination level is above the threshold illumination level.

2. The computer-implemented method of claim 1, further comprising:

determining that the illumination level is below the threshold illumination level;

processing image data captured by the low-lux sensor;

determining that the illumination level is above the threshold illumination level; and processing image data captured by the high-lux sensor.

3. The computer-implemented method of claim 1, further comprising activating an illumination source responsive to determining that the illumination level is below the threshold illumination level.

4. The computer-implemented method of claim 1, wherein the low-lux sensor and the high-lux sensor have different luminance ranges, wherein luminance range of a sensor is a range of scene luminance under which the sensor is equipped to capture image data.

5. The computer-implemented method of claim 4, wherein the luminance ranges of the low-lux sensor and the high-lux sensor overlap, and the threshold illumination level is within the overlap of the luminance ranges.

6. The computer-implemented method of claim 1, wherein the high-lux sensor comprises an infrared filter to reduce an amount of infrared light reaching the high-lux sensor.

7. The computer-implemented method of claim 3, wherein the illumination source emits a light with a spectrum that lies within a range at a peak of a response curve of the low-lux sensor.

8. The computer-implemented method of claim 1, further comprising:

responsive to determining that the illumination level is below the threshold illumination level, determining whether the high-lux sensor is active; and responsive to determining that the high-lux sensor is active, deactivating the active high-lux sensor.

9. A computer program product for capturing image data, the computer program product comprising a non-transitory computer-readable storage medium including computer program code for:

determining an illumination level using a low-lux sensor and a high-lux sensor, the low-lux sensor assigned to capture image data when illumination levels are below a threshold illumination level, the high-lux sensor assigned to capture image data when illumination levels are above a threshold illumination level;

determining, by an illumination threshold module, whether the determined illumination level is below a threshold illumination level;

processing image data captured by the low-lux sensor indicative of one or more gestures when the illumination level is below the threshold illumination level; and processing image data captured by the high-lux sensor indicative of one or more gestures when the illumination level is above the threshold illumination level.

10. The computer program product of claim 9, further comprising computer program code for:

determining that the illumination level is below the threshold illumination level;

processing image data captured by the low-lux sensor;

determining that the illumination level is above the threshold illumination level; and processing image data captured by the high-lux sensor.

11. The computer program product of claim 9, further comprising computer program code for activating an illumination source responsive to determining that the illumination level is below the threshold illumination level.

12. The computer program product of claim 9, wherein the low-lux sensor and the high-lux sensor have different luminance ranges, wherein luminance range of a sensor is a range of scene luminance under which the sensor is equipped to capture image data.

13. The computer program product of claim 12, wherein the luminance ranges of the low-lux sensor and the high-lux sensor overlap, and the threshold illumination level is within the overlap of the luminance ranges.

14. The computer program product of claim 9, wherein the high-lux sensor comprises an infrared filter to reduce an amount of infrared light reaching the high-lux sensor.

15. The computer program product of claim 11, wherein the illumination source emits a light with a spectrum that lies within a range at a peak of a response curve of the low-lux sensor.

16. The computer program product of claim 9, further comprising computer program code for:

responsive to determining that the illumination level is below the threshold illumination level, determining whether the high-lux sensor is active; and responsive to determining that the high-lux sensor is active, deactivating the active high-lux sensor.

17. A computer system for capturing image data, the computer system comprising a processor and a non-transitory computer readable medium, the computer readable medium including computer program code for:

determining an illumination level using a low-lux sensor and a high-lux sensor, the low-lux sensor assigned to capture image data when illumination levels are below a threshold illumination level, the high-lux sensor assigned to capture image data when illumination levels above a threshold illumination level;

determining, by an illumination threshold module, whether the determined illumination level is below the threshold illumination level;

processing image data captured by the low-lux sensor indicative of one or more gestures when the illumination level is below the threshold illumination level; and processing image data captured by the high-lux sensor indicative of one or more gestures when the illumination level is above the threshold illumination level.

18. The computer system of claim 17, further comprising computer program code for:

determining that the illumination level is below the threshold illumination level;

processing image data captured by the low-lux sensor;

determining that the illumination level is above the threshold illumination level; and processing image data captured by the high-lux sensor.

19. The computer system of claim 17, further comprising computer program code for activating an illumination source responsive to determining that the illumination level is below the threshold illumination level.

20. The computer system of claim 17, wherein the low-lux sensor and the high-lux sensor have different luminance ranges, wherein luminance range of a sensor is a range of scene luminance under which the sensor is equipped to capture image data.

* * * * *